United States Patent [19]

Marinus

[11] Patent Number: 4,766,528
[45] Date of Patent: * Aug. 23, 1988

[54] SWITCHED-MODE POWER SUPPLY HAVING A STANDBY STATE

[75] Inventor: Antonius A. M. Marinus, Eindhoven, Netherlands

[73] Assignee: U.S. Philips Corporation, New York, N.Y.

[*] Notice: The portion of the term of this patent subsequent to Aug. 18, 2004 has been disclaimed.

[21] Appl. No.: 24,275

[22] Filed: Mar. 10, 1987

Related U.S. Application Data

[63] Continuation of Ser. No. 890,592, Jul. 30, 1986.

[30] Foreign Application Priority Data

Aug. 26, 1985 [NL] Netherlands ............ 8502338

[51] Int. Cl.$^4$ .................................... H02M 3/335
[52] U.S. Cl. ................................. 363/21; 363/19
[58] Field of Search ...................... 363/18, 19, 21; 358/190

[56] References Cited

U.S. PATENT DOCUMENTS

| | | | |
|---|---|---|---|
| 4,167,036 | 9/1979 | Kenney | 363/18 |
| 4,322,786 | 3/1982 | Weber | 363/21 |
| 4,688,159 | 8/1987 | Marinus | 363/19 |

Primary Examiner—Patrick R. Salce
Assistant Examiner—Jeffrey Sterrett
Attorney, Agent, or Firm—David R. Treacy; Bernard Franzblau

[57] ABSTRACT

A switched-mode power supply circuit with having an operating state and a stand-by state in which the value of a first output voltage is considerably lower than in the operating state, whereas the value of a second output voltage is substantially the same. With the aid of a duration-determining circuit (Tr7, Tr8, R17, C12) which is controlled by a switch (Tr6) operative during the stand-by state, a low-frequency burst mode is maintained during this state in which the switch of the supply circuit conducts a number of consecutive times and subsequently becomes non-conductive during a given period. As a result the dissipation in the circuit is reduced.

6 Claims, 2 Drawing Sheets

SWITCHED-MODE POWER SUPPLY HAVING A STANDBY STATE

This is a continuation of application Ser. No. 890,592 filed July 30, 1986.

BACKGROUND OF THE INVENTION

This invention relates to a switched-mode power supply circuit having an operating state and a standby state and comprising a controllable first switch arranged in series with the primary winding of a transformer. The series arrangement thus formed is coupled to the terminals of a d.c. input voltage. The transformer has a first secondary winding for providing a first d.c. output voltage in the operating state and a second secondary winding for providing a second d.c. output voltage. The circuit also comprises a second switch for bringing the supply circuit into the stand-by state in which the value of the first output voltage is considerably lower than in the operating state, and a third switch controllable by means of the second switch and coupled to the second secondary winding for maintaining the second output voltage in the stand-by state at substantially the same value as in the operating state. The circuit further comprises a comparison stage for comparing an output voltage with a reference voltage and for generating a control signal for controlling the duration of periodically occurring drive pulses applied to the first switch.

A power supply circuit of this type is known from German Patent Application No. 3,223,756. In this known circuit, which is intended for use in a television receiver, both the first output voltage and other output voltages, which are derived from secondary windings of the transformer, have a lower value in the stand-by state than in the operating state so that the power consumption is smaller, while the second output voltage, to which a remote control is connected, has substantially the same value. In the stand-by state the first switch continues to operate normally, though every time with a shorter conduction period than in the operating state. This continuous operation at a high frequency, i.e. 25 to 30 kHz involves, however, quite a considerable power dissipation.

SUMMARY OF THE INVENTION

It is an object of the invention to provide a power supply circuit of the type described above having a lower dissipation relative to that of the known circuit. To this end the power supply circuit according to the invention is characterized in that a duration-determining element is coupled to the second secondary winding and to the comparison stage for maintaining an oscillation mode in the stand-by state. The first switch is conductive a number of consecutive times and subsequently becomes non-conductive during a given period under the influence of the control signal. The frequency of said oscillation is many times lower than the repetition frequency of the drive pulses applied to the first switch.

In accordance with this mode of oscillation the first switch conducts every time for only a short period during which energy is built up in the transformer, and subsequently the switch is rendered non-conducting. Since this is a low-frequency process, of the order of, for example, 100 to 200 Hz, the losses, predominantly the losses in the transformer and in the switch, are fairly low.

The circuit is advantageously characterized in that the second switch is coupled to the duration-determining element for controlling said element. The duration-determining element then comprises a time constant network. Thus, the second switch controls both the third switch and the duration-determining element.

The circuit according to the invention is preferably characterized in that the comparison stage is controllable by means of the second switch for comparing the second output voltage with a reference voltage during the stand-by state and for generating a control signal during a period determined by the time-constant network. This control signal is suitable for rendering the first switch non-conducting after the first output voltage has reached a given value. This measure ensures that the control circuit remains operative under all circumstances.

BRIEF DESCRIPTION OF THE DRAWINGS

The invention will be described in greater detail by way of example with reference to the accompanying drawing in which.

DESCRIPTION OF THE PREFERRED EMBODIMENTS

Figure 1:
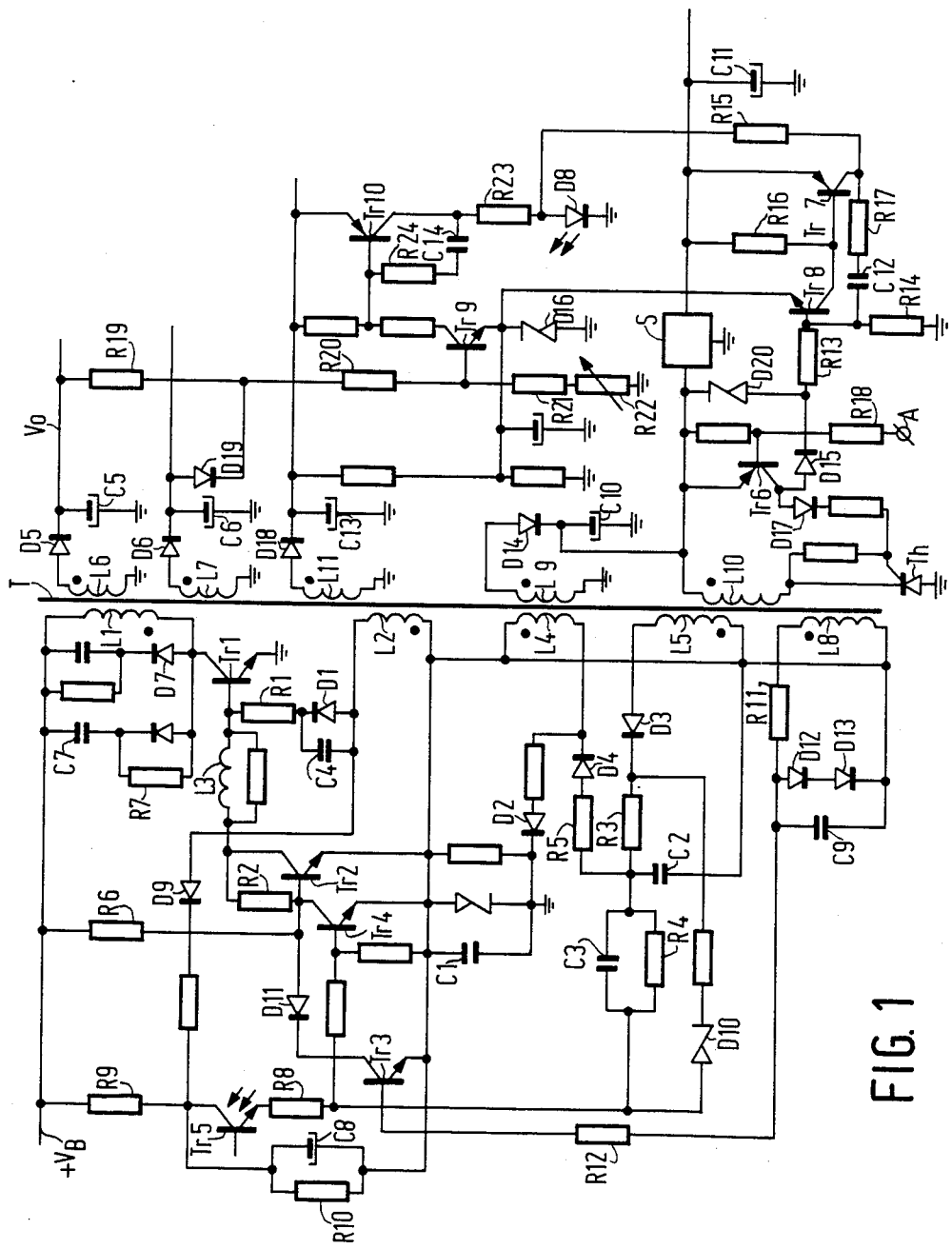
FIG. 1 is a basic circuit diagram of a power supply circuit according to the invention.

The self-oscillating power supply circuit of FIG. 1 comprises an npn power switching transistor Tr1 whose collector is connected to the primary winding L1 of a transformer T, while the emitter is connected to ground. The other end of winding L1 is connected to the positive rail of an unstabilized power supply source $V_B$ whose negative rail is also connected to ground and which is, for example, a mains rectifier. The turn-on path of transistor Tr1, which is connected between the base of the transistor and ground, comprises a capacitor C1, a feedback winding L2 of transformer T, a diode D1 and a resistor R1. The base current flowing during the conduction period of transistor Tr1 produces a negative voltage across capacitor C1. The turn-off path of transistor Tr1, which is also connected to the base thereof, comprises capacitor C1, the emitter-collector path of a pnp transistor Tr2 having a base-emitter resistor R2, and an inductance L3. Upon turn-off a reverse base current of transistor Tr1 flows through elements C1, Tr2 and L3 so that the charge carriers stored in this transistor during the conduction period are removed. A negative voltage for capacitor C1 is generated with the aid of a further winding L4 of transformer T and a diode D2 in case the forward base current of transistor Tr1 flows for too short a time, under given circumstances, to build up a sufficiently constant voltage across capacitor C1. FIG. 1 shows the winding sense of the windings of transformer T by means of dots.

One end of a winding L5 of transformer T is connected to a diode D3, the other end of which is connected to the series network of a resistor R3 and a capacitor C2. Winding L5 has such a winding sense and diode D3 has such a conductivity direction that a charge current for capacitor C2 flows through resistor R3 during the conduction period of transistor Tr1. The bottom end of capacitor C2 is connected to the junction of capacitor C1, winding L2 and the collector of transistor Tr2. With respect to the d.c. voltage level present at this junction, a sawtooth voltage is produced across capacitor C2. This voltage is passed on to the base of an npn transistor Tr4 via an RC parallel network R4, C3. The emitter of transistor Tr4 is connected to the said junction, while the collector is connected to the base of transistor Tr2. At a given instant the voltage at the base of transistor Tr4 reaches a value at which the transistor is rendered conducting. As a result transistor Tr2 is also rendered conducting. The voltage at the emitter of this transistor assumes substantially the same value as the negative voltage of approximately $-5$ V which is present across capacitor C1, which initiates the turn-off of transistor Tr1. During the period of time when transistor Tr1 is non-conductive, capacitor C2 is discharged via a resistor R5, a diode D4 and winding L4, while a reverse current flows through transistor Tr2 which current also flows through resistor R1 and through a capacitor C4 which is connected in parallel with diode D1.

A starting resistor R6 having a high value is arranged between the positive rail of source $V_B$ and the base of transisor Tr2. When the circuit is turned on, a current flows through resistors R6 and R2 which also flows through capacitor C4 and winding L2 so that energy is built up in transformer T. Due to this current the voltage at the base of transistor Tr1 increases until a value is reached at which the transistor becomes conducting. Also during normal operation a current flows through resistor R6, but its value is too low to have a noticeable influence on the behaviour of the circuit.

Secondary windings are provided on the core of transformer T. FIG. 1 shows a number of these windings, for example, L6 and L7. When transistor Tr1 is turned off, a current for recharging smoothing capacitors C5 and C6 flows via rectifiers, for example, D5 and D6, respectively, through each secondary winding. The other ends of capacitors C5 and C6 are connected to ground. The voltages across these capacitors are the output voltages of the supply circuit for loads connectable thereto. These loads, which are not shown in FIG. 1, are, for example, parts of a television receiver.

A network comprising a tuning capacitor C7 and a damping resistor R7, as well as a clamping network with a diode D7 is arranged in parallel with winding L1. Winding L1 and capacitor C7, as well as parasitic capacitances, constitute a resonant circuit in which an oscillation is produced in the intervals when transistor Tr1 and rectifiers D5 and D6 carry no current. Parasitic oscillations which might be produced during the period of time when transistor Tr1 is non-conducting are reduced by means of the said clamping network.

The output voltages of the supply circuit are kept substantially constant in spite of variations of the voltage $V_B$ and/or of the loads by controlling the conduction periods of transistor Tr1. For this purpose the circuit includes a light-emitting diode D8 which is optically coupled to a light-sensitive npn-transistor Tr5 having an emitter resistor R8 which is connected in the base lead of transistor Tr4, as is the network R4, C3. A collector resistor R9 is connected to the source $V_B$ and the base is unconnected. The collector of transistor Tr5 is also connected via an RC parallel network R10, C8 to the junction of windings L2 and L4 and capacitor C1 and is further connected via a diode D9 to the junction of winding L2 and diode D1. A positive voltage is thus present at the said collector. If the current through diode D8 varies in a manner to be described hereinafter, the emitter current of transistor Tr5 also varies. An increase of this current, for example, involves an increase in the voltage at the base of transistor Tr4 so that transistor Tr1 is turned off at an earlier instant than would otherwise be the case. The final value of transistor Tr1 is thus lower, resulting in the output voltages of the circuit also being lower. This control is also dependent on variations of the voltage $V_B$ by means of a network comprising a Zener-diode D10 which is connected between the junction of resistors R4 and R8 and the junction of resistor R3 and diode D3.

Figure 2:
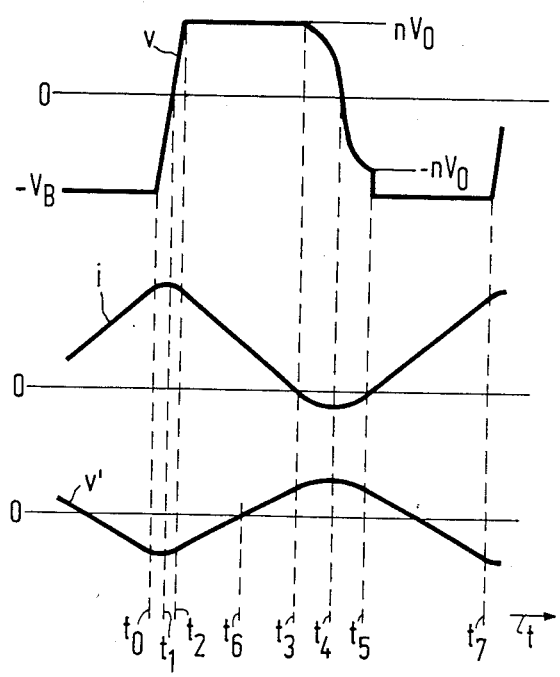
FIG. 2 shows waveforms occurring therein.

The foregoing is well known to those skilled in the art and does not require any further explanation. Further details are therefore not discussed. The same applies to safety precautions against overvoltages and overcurrents which are formed in known manner. For a better understanding of the operation of the circuit, FIG. 2 shows some idealized waveforms: FIG. 2a shows the variation as a function of time of the voltage V across winding L1, i.e. the same variation but for a d.c. level, more specifically that of source $V_B$, as that of the voltage across the collector of transistor Tr1, and FIG. 2b shows the variation of the current i flowing through winding L1.

Transistor Tr1 is turned off at an instant $t_o$. Before this instant the current i increases linearly, while the voltage v has the value $-V_B$. After instant $t_o$ the voltage v increases in accordance with a sine function of time, whereas current i varies in accordance with a cosine function. At an instant $t_1$ voltage v reaches the value of zero and the current i has a maximum value. Voltage v continues to increase until the value is reached at an instant $t_2$ when the rectifiers on the secondary side start conducting. If the voltage across capacitor C5 is equal to $V_o$ and if the tranformation ratio of windings L1 and L6 is n:1, voltage v remains equal to $nV_o$ after the instant $t_2$, whereas the current i decreases linearly, more specifically until the value of zero is reached at an instant $t_3$. After the instant $t_3$ the rectifiers do not carry any current, and the voltage v decreases in accordance with a sine function by at the same resonance frequency as between the instants $t_o$ and $t_2$, but at a lower peak value, being $nV_o$, while the current i becomes negative. Current i flows to capacitor C7 and varies in accordance with a cosine function. Without any further measures a current would thus be produced in winding L2 which would flow through diode D1 to the base of transistor Tr1. FIGS. 1 and 2a show that transistor Tr1 would thereby be rendered conducting at an instant after instant $t_3$ when the sum of the voltage across winding L2 and the voltage across capacitors C1 and C4 will be lower than the base-emitter threshold voltage of the transistor. This instant occurs shortly after instant $t_3$ before the voltage v becomes zero, that is to say, upon turnon, the voltage at the collector of transistor Tr1 would be slightly lower than the value $V_B + nV_o$.

It appears from the foregoing that without any further measures the voltage at the collector of transistor Tr1 is fairly high upon turn-on which causes a considerable switching dissipation in transistor Tr1 and in resistor R7. To reduce the turn-on losses, the circuit of FIG. 1 includes an npn transistor Tr3 whose emitter is connected to the junction of capacitor C1 and winding L2 and whose collector is connected to the base of transistor Tr2 via a diode D11 having the same conductivity direction as the collector-emitter path of transistor Tr3. One end of winding L8 of transformer T is connected to the emitter of transistor Tr3 and the other end is connected to an integrating network consisting of a resistor R11 and a capacitor C9, said capacitor being arranged between resistor R11 and the said emitter. The junction of capacitor C9 and resistor R11 is connected via a limiting resistor R12 to the base of transistor Tr3. The winding sense of winding L8 is such that the voltage at the junction of resistor R11 has the same polarity as the voltage shown in FIG. 2a, that is to say, the voltage under consideration is negative before the instant $t_1$ and positive after this instant. Under these circumstances the voltage v' across capacitor C9 which is proportional to the integral of the voltage at the last-mentioned junction has the same time variation as the current i in FIG. 2b but a polarity opposed thereto. In fact, current i is proportional to the integral of voltage v.

FIG. 2c shows the variation of the voltage v'. Since both the voltage across winding L8 and the current through capacitor C9 have a mean value of zero over one oscillation period, the mean value of the voltage v' is also zero. This means that voltage v' reverses its polarity and becomes positive at an instant $t_6$ which is located earlier than instant $t_3$. The time constant of the RC network R11, C9 is chosen so that the voltage v' will exceed the value of the base-emitter threshold voltage of transistor Tr3 after instant $t_3$. This shows that this transistor conducts after instant $t_3$ and maintains transistor Tr1 in the non-conducting state in the same manner as transistor Tr4 does at the instant $t_o$, more specifically because transistor Tr2 conducts. Since the base of transistor Tr1 carries a negative voltage via the conducting transistor Tr2, while the voltage at the base of transistor Tr3 is positive, a current would flow through the base-collector diode of transistor Tr3, which would cause a distortion of the waveforms. This is prevented by the diode D11.

At an instant $t_4$ which occurs one fourth of the resonance period of winding L1 and capacitor C7 later than instant $t_3$, voltage v becomes zero while the current i reaches a minimum value. At an instant $t_5$ voltage v reaches a minimum value, while the current i again becomes zero and subsequently becomes positive. Instants $t_3$ and $t_5$ are symmetrical relative to instant $t_4$ so that the minimum value of the voltage v is substantially equal to $-nV_o$, while the minimum value of the voltage at the collector of transistor Tr1 is substantially equal to $V_B-nV_o$. Due to the symmetry, voltage v' decreases to a lower value than the threshold voltage of transistor Tr3 after the instant $t_5$ so that this transistor is rendered non-conducting. The voltage at the base of transistor Tr2 becomes positive so that this transistor also becomes non-conductive resulting in transistor Tr1 being rendered conducting. The voltage at its collector then becomes substantially zero and consequently voltage v becomes equal to $-V_B$. This state is maintained while the current i increases linearly until transistor Tr1 is again rendered non-conducting under the influence of the control, more specifically at an instant $t_7$ which is located one oscillation period later than instant $t_o$, whereafter the variation described is repeated.

It is evident from the foregoing that due to the operation of transistor Tr3 the turn-on instant of transistor Tr1 is delayed until the instant $t_5$ when the voltage at the collector of transistor Tr1 has a minimum value. This involves a considerable saving in energy and also extends the life of the transistor. It will be obvious that the delay should be fairly accurate because the voltage v before and after the instant $t_5$ is higher than the minimum value at this instant. In this respect an improvement is obtained by series arranging two diodes D12 and D13 having the same conductivity directions in parallel with capacitor C9, and with the anode of diode D12 connected to the junction of elements R11, R12 and C9. As a result the maximum value of voltage v' at the instant $t_4$ is approximately equal to twice a diode threshold voltage, i.e. approximately 1.4 V. The maximum value of the base-emitter voltage of transistor Tr3 is therefore equal to one threshold voltage, more specifically during a given time interval starting before the instant $t_4$ and ending after this instant. The circuit may be dimensioned in such a manner that this interval substantially coincides with the period between the instants $t_3$ and $t_5$. In one embodiment of the delay circuit the resistors R11 and R12 had values of 8.2 and 2.2 kOhm, respectively, while the capacitance of capacitor C9 was approximately 4.7 nF, and the frequency of the oscillation, i.e. the inverse of the period between the instants $t_o$ and $t_7$, could vary between 25 and 60 kHz.

The foregoing description applies to the case where the supply circuit is dimensioned in such a manner that the voltage $V_B$ is lower than $nV_o$, in which case the minimum value of the voltage at the collector of transistor Tr1 just before turning on the transistor is positive. In the opposite case the said voltage becomes zero at an instant which is located earlier than instant $t_5$ whereafter a reverse current flows through the base-collector diode of transistor Tr1, while the said voltage is negative. At the instant $t_5$ this current is switched off in the same manner as described above. If necessary, a diode may be connected in parallel with the collector-emitter path of transistor Tr1, which diode has its conductivity direction opposed to this path and through which the reverse current flows. To ensure that no reverse current flows through the transistor, a diode may be arranged in series with the transistor and with the same conductivity direction as this transistor, while the anti-parallel diode is arranged between the junction of the series diode with winding L1 and ground. It will be noted that the dissipation caused by the reverse current is smaller in this case, because the voltage at the collector is maintained at a low value by the conducting anti-parallel diode, than the dissipation caused by the forward current in FIG. 2 which is many times larger, namely proportional to $\frac{1}{2}Cv^2$ and to the oscillation frequency. In this case C is the capacitance which is effectively in parallel with transistor Tr1. In addition the said reverse current returns to the source $V_B$.

The series arrangement of a diode D14 and a capacitor C10 is connected to a secondary winding L9 of transformer T with the anode of diode D14 connected to the end of winding L9 which is not connected to ground. One end of a further secondary winding L10 of transformer T, which has more turns than winding L9, is connected to the junction of diode D14 and capacitor C10 and the other end is connected to the cathode of a thyristor Th. The anode of thyristor Th is connected to ground. A series arrangement constituted by the emitter-collector path of a pnp transistor Tr6, a diode D15 and a voltage divider consisting of two resistors R13 and R14 is connected in parallel with capacitor C10. The emitter of transistor Tr6 is connected to the input of a series control circuit S whose output voltage is smoothed by means of a capacitor C11. The series arrangement of the emitter-collector path of a pnp transistor Tr7, a resistor R15 and the above-mentioned light-emitting diode D8 is connected in parallel with capacitor C11. The base of an npn transistor Tr8 is connected to the junction of resistors R13 and R14, while the collector is connected to the base of transistor Tr7 and to a resistor R16 and the emitter is connected to the cathode of a Zener-diode D16, the other end of which is connected to ground. The other end of resistor R16 is connected to the output of circuit S. A diode D17 is incorporated between the collector of transistor Tr6 and the cathode-gate of thyristor Th. This diode has the same conductivity direction as transistor Tr6. An RC-series network R17, C12 is incorporated between the base of transistor Tr8 and the collector of transistor Tr7. Finally, a resistor R18 connects the base of transistor Tr6 to a terminal A.

In the normal operating state transistor Tr6 does not conduct because terminal A is either not connected or is connected to a positive voltage. Diode D17 neither does not conduct and consequently thyristor Th does not conduct either. As a result winding L10 remains currentless and capacitor C10 carries a d.c. voltage of, for example, approximately 7 V which is derived from the voltage across winding L9 by means of diode D14. A voltage of, for example, 5 V for a microprocessor in the control section of the receiver and or remote control is present across capacitor C11. Transistors Tr7 and Tr8 also remain non-conducting.

For controlling the output voltages of the supply circuit, this circuit is provided with a further secondary winding L11 of the transformer T, a rectifier D18 and a smoothing capacitor C13. By means of a voltage divider arranged in parallel with capacitor C5 and consistng of resistors R19, R20, R21 and R22, the base of an npn transistor Tr9, which is connected to the junction of resistors R20 and R21, is adjusted to a d.c. voltage which is proportional to the output voltage $V_o$ across capacitor C5. The emitter of transistor Tr9 is connected to a Zener diode D16. The voltage at the base is compared with the voltage of diode D16 by means of transistor Tr9. The difference measured determines the collector current of a pnp transistor Tr10 whose emitter is connected to capacitor C13 and whose collector is connected via a resistor R23 to the anode of diode D8 and consequently determines the current through diode D8 and therefore the emitter current of transistor Tr5. If, for example, the output voltage increases as a result of a decreasing load and/or as a result of an increase of voltage $V_B$, the collector current of transistor Tr9 and consequently the control current through diode D8 also increase. In the manner already explained this increase causes a reduction in the conductivity period of transistor Tr1, which counteracts the increase of the output voltage. An RC series network R24, C14 is incorporated between the base and the collector of transistor Tr10 for reducing the loop gain at a high frequency, thereby improving the stability of the control. A diode D19 is arranged between capacitor C6 and the junction of resistors R19 and R20 and provides a safety feature in case the diode D5, with which the highest output voltage $V_o$ is generated, becomes defective. In this case, when diode D5 is interrupted, the voltage across capacitor C5 becomes zero. The control then attempts to increase this voltage, but this is prevented because diode D19 starts conducting so that now the voltage across capacitor C6 is controlled.

By connecting terminal A to ground the supply circuit of FIG. 1 is brought into the stand-by state during which most parts of the television receiver receive very little supply energy. Transistor Tr6 then starts conducting so that current flows through diode D17 to the cathode gate of thyristor Th which also starts conducting, while diode D14 is rendered non-conducting as will be further explained. A current flows through diode D15 to the base of transistor Tr8 which is rendered conducting so that transistor Tr7 also becomes conducting. The increase of the voltage at the collector of transistor Tr7 is passed on to the base of transistor Tr8 by the network R17, C12. Thus, transistors Tr7 and Tr8 constitute a monostable multivibrator which remains in its state reached during a period which is determined, inter alia, by the time constant of network R17, C12, even after the voltage $V_1$ across capacitor C10 has become low. A part of the voltage $V_1$ is compared with the voltage of Zener diode D16 by means of transistor Tr8. The difference measured determines the collector current of transistor Tr7, which current flows through diode D8. The part of the circuit including winding L10 thus forms part of a control loop for maintaining the voltage $V_1$ substantially constant, which control loop is put into operation by switching over to the stand-by state by means of terminal A.

The number of turns of winding L10 has been chosen to be such that during the stand-by state the output voltages of the supply circuit, that is to say, the direct voltages derived from the other secondary windings L6, L7 and L11 are reduced to low values with little power being dissipated in the loads. This may be explained with reference to the following figures. When, for example, winding L6 has 44 turns, L7 has 7 turns, L9 has 2 turns and L10 has 15 turns, respectively, and when the voltage $V_o$ across capacitor C5 is approximately 140 V in the operating state, the voltage across capacitor C6 is $$\frac{140 \times 7}{44} = 22.3 \text{ V};$$

the voltage across capacitor C10 is $$\frac{140 \times 2}{44} = 6.4 \text{ V}$$

and a direct voltage derived from winding L10 by rectification is $$\frac{140 \times 15}{44} = 47.7 \text{ V}.$$

When voltage $V_1$ is maintained at 8 V in the stand-by state, a direct voltage derived from winding L9 by rectification would be $$\frac{8 \times 2}{15} = 1.1 \text{ V}$$

which shows that diode D14 is not conducting, and the voltage across capacitor C6 is $$\frac{8 \times 7}{15} = 3.7 \text{ V},$$

while the voltage across capacitor C5 is $$\frac{8 \times 44}{15} = 23.5 \text{ V}.$$

The latter two values are so low that a synchronizing circuit connected to capacitor C6 and a line deflection circuit connected to capacitor C5 cannot operate properly, which produces a very low consumption. The output voltages are proportionally reduced and the different loads need not be turned off, while the voltage across capacitor C11 has substantially the same value as in the operating state.

Under these circumstances the conduction period of transistor Tr1, i.e. the interval between the instants $t_5$ and $t_7$ in FIG. 2 becomes increasingly shorter due to the operation of the control after a switch-over to the stand-by state has been effected. This conduction period has, however, a minimum value which is determined by the storage period of the charge carriers in transistor Tr1. During this period which cannot come, for example, below approximately 3 to 5 μs, the collector current of this transistor increases to a peak value which depends on the said period and also on the voltage $V_B$ and which, similar to the storage period, is subject to variations caused by tolerances. Due to this current more energy is stored in transformer T than is extracted from it so that the output voltages tend to increase again after having been low. This is, however, prevented by the control: diode D8 produces such a large control current that transistor Tr1 is turned off and remains in the non-conducting state because transistor Tr4 continuously remains conducting due to the large emitter current of transistor Tr5. In the stand-by state transistor Tr5 has a collector voltage via resistor R9. The output voltages and also the control current now decrease again because capacitors C5, C6, C10 and C13 are discharged, more specifically until the voltage $V_1$ reaches a value at which the power supply circuit starts again. Transistor Tr1 becomes conducting in the manner already described, resulting in the capacitors on the secondary side of transformer T being charged again. An intermittent current flows through thyristor Th so that the voltage across capacitor C10 reaches a level at which transistor Tr8 is rendered conducting again, which restores the control loop. The process described is subsequently repeated.

It is evident from the foregoing that in the stand-by state the supply circuit of FIG. 1 is in a state in which a burst mode is generated, i.e. with an oscillation which is interrupted periodically, in which state very short current pulses flow through transistor Tr1 while the secondary voltages increase, whereafter the transistor is non-conducting while the secondary voltages decrease slowly. The advantage of such a burst mode is that the efficiency is then favourable. In fact, if the supply circuit continuously operated with low or turned-off loads, the frequency of the oscillation would become high because the interval between the instants $t_2$ and $t_3$ in FIG. 2 would become very short. This would involve great losses in the transformer as well as great switching losses in transistor Tr1 and resistor R7. The burst mode is, however, not produced with certainty, particularly not if the value of voltage $V_B$ can vary within a large voltage range. Other reasons therefor may be: short storage time of the power transistor and high power consumption in the stand-by state. To ensure that the supply circuit continues to oscillate in the described manner in the stand-by state, that is to say, that it does not come into a continuous state, the monostable multivibrator make up of transistors Tr7 and Tr8 is provided, with which a hysteresis is obtained. Due to the hysteresis transistor Tr7 is maintained conducting for some time during which time a large current continues to flow through diode D8 so that transistor Tr1 remains non-conducting while the output voltages decrease. This "dead period" of the burst mode is determined by the time constant of the network R17, C12, the starting resistor R6 and the capacitor C4 through which the starting current flows. For this oscillation a low frequency of approximately 100 Hz has been found useful in practice. A substantially constant voltage is obtained with the aid of a circuit S for the voltage across capacitor C11.

The anode of a Zener diode D20 is connected to the cathode of diode D15 and the cathode of diode D20 is connected to capacitor C10. When at an instant when thyristor Th would become inoperative the connection of terminal A to ground is interrupted for switching to the operating state of the receiver, thyristor Th can still remain conducting for some time due to its inertia while the control loop is open. Under these circumstances voltage $V_1$ would tend to increase, more specifically until the voltage across winding L10 reaches the above-mentioned value of 47.7 V. Thanks to diode D20 the voltage across capacitor C10 does not exceed a given value. The supply circuit thus remains in the burst mode for a short time until thyristor Th is extinguished, whereafter the voltage across capacitor C10 is again determined by diode D14.

A further refinement is to connect the connection of resistor R6, which is not connected to transistor Tr2, to the junction of two resistors which are not shown for the sake of simplicity, instead of to source $V_B$ as is shown in FIG. 1. The other connection of each of these resistors is connected to a terminal of the mains voltage, the said junction being connected to ground via a capacitor having a low capacitance. If without this measure the supply is switched off by operating a mains switch while the receiver is still in the stand-by state, the stand-by state is still maintained for several seconds due to the burst mode before a signal lamp is extinguished. This is prevented because the voltage across the above-mentioned capacitor drops off rapidly so that the starting current goes rapidly to zero. The supply circuit therefore does not leave the "dead period" of the burst mode.

It may be noted that the output voltages can also be decreased in the stand-by state by decreasing the Zener voltage with which a comparison is made. Compared to the above-described measure a drawback of this measure by which diode D16 is switched over, while the windings L9 and L10 and the components connected thereto are omitted, is that the collector current of transistor Tr9 is high during the decrease of the output voltages, which causes a large control current through diode D8 and brings transistor Tr1 into the non-conducting state. The result thereof is that the supply circuit does not apply a voltage for quite some time to the remote control and to the operating microprocessor, which is undesirable.

It will be evident that variants which are within the scope of the invention will be apparent for the circuit described. This applies to, for example, transistor Tr1 which may be replaced by an equivalent power switch, for example, a gate turn-off switch. This also applies to a plurality of circuit-technical details, for example, the circuits for turning off transistor Tr1 or for turning on this transistor. Variants can also be considered for the switch-over from and to the stand-by state, for example, for the switch-over facility consisting of transistor Tr6 and thyristor Th which may have a different form, and for winding L9 which may be a winding of a line output transformer or which may be omitted altogether, while the anode of diode D14 is connected to, for example, capacitor C13, and variants can also be considered for the implementation of the mulivibrator made up of transistors Tr7 and Tr8 and of the time-constant network. This also applies to the number of common elements in the first control loop for maintaining the voltage $V_o$ and the other output voltages constant in the operating state, and in the second control loop for maintaining the voltage $V_1$ for the remote control constant in the stand-by state, while the other output voltages are greatly reduced. Similarly, the differential amplifier may be common in both control loops.

It will be evident that the manner in which the stand-by state is maintained, both in the circuit of FIG. 1 and in variants of this circuit, can also be used for other supply circuits: it is important that a circuit is concerned which is designed such that a large control current results in the power switch being switched off. Such a circuit has been described, for example, in U.S. Pat. No. 4,486,822 or in the U.S. Pat. No. 4,631,654. The latter circuit is not self-oscillating.

What is claimed is:

1. A self-oscillating power supply circuit having an operating state and a stand-by state comprising: a pair of terminals for connection to a source of DC voltage, a transformer having a primary winding and at least first and second secondary windings, a first controllable switch connected in series arrangement with the primary winding of the transformer, means coupling said series arrangement to said pair of terminals, said first and second secondary windings supplying first and second DC output voltages, respectively, in the operating state of the power supply circuit, a second controllable switch for controlling the power supply circuit into the stand-by state wherein the first secondary winding supplies a lower value of the first DC output voltage than in the operating state, a third controllable switch coupled to the second secondary winding and controlled by the second switch so that in the stand-by state the second secondary winding maintains the second output voltage at approximately the same value as in the operating state, a comparison stage for comparing an output voltage with a reference voltage and for generating a control signal for controlling the duration of periodically occurring drive pulses applied to the first switch, and a duration-determining circuit controlled by the second switch in the stand-by state so as to maintain a burst oscillation mode in which the first switch conducts a number of consecutive times and subsequently is non-conductive for a given time period and with an oscillation frequency much lower than the repetition frequency of said drive pulses.

2. A power supply circuit as claimed in claim 1 wherein the first switch comprises a transistor having a control electrode and the transformer further comprises a feedback winding, said power supply circuit further comprising, a turn-on path and a turn-off path coupled to said control electrode, said turn-on path comprising a first series circuit including a capacitor, said feedback winding and a diode, and said turn-off path comprises a second series circuit including said capacitor, a second transistor and an inductor.

3. A power supply circuit as claimed in claim 1 wherein said duration-determining circuit comprises a monostable multivibrator having an RC time constant network.

4. A power supply circuit as claimed in claim 1 wherein the transformer includes a further winding coupled to the second secondary winding via a diode that also rectifies the voltage generated in the second secondary winding thereby to develop said second DC output voltage, means coupling said third switch to said further winding so that operation of the third switch in the stand-by state provides a path for current to flow through the further winding, the turns ratio of the second secondary winding and the further winding being chosen so that said diode conducts during the operating state and is cut-off in the stand-by state of the power supply circuit.

5. A power supply circuit as claimed in claim 1 further comprising, a light emitting diode (LED) controlled by said duration-determining circuit, and a light-sensitive semiconductor element optically controlled by said LED and electrically coupled to a control electrode of the first switch so that the conduction periods of the first switch are determined by the LED in a sense so as to maintain the output voltages of the power supply circuit constant in spite of variations of the DC voltage at said pair of terminals and/or of loads coupled to the secondary windings.

6. A power supply circuit as claimed in claim 1 further comprising a capacitor coupled in parallel with said primary winding to form a parallel resonant circuit.

* * * * *